US012662422B2

(12) United States Patent
Qian et al.

(10) Patent No.: US 12,662,422 B2
(45) Date of Patent: Jun. 23, 2026

(54) COLOR-ADJUSTABLE REPAIRING AGENT AND PREPARATION METHOD THEREFOR, AND CONCRETE CONTAINING REPAIRING AGENT

(71) Applicant: SOUTHEAST UNIVERSITY, Nanjing (CN)

(72) Inventors: Chunxiang Qian, Nanjing (CN); Xinwei Ren, Nanjing (CN); Qinwen Chen, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 360 days.

(21) Appl. No.: 18/276,065

(22) PCT Filed: Aug. 19, 2021

(86) PCT No.: PCT/CN2021/113384
§ 371 (c)(1),
(2) Date: Aug. 7, 2023

(87) PCT Pub. No.: WO2023/272905
PCT Pub. Date: Jan. 5, 2023

(65) Prior Publication Data

US 2024/0132403 A1 Apr. 25, 2024

(30) Foreign Application Priority Data

Jun. 28, 2021 (CN) ........................ 202110719320.2

(51) Int. Cl.
*C04B 16/00* (2006.01)
*C04B 7/02* (2006.01)
(Continued)

(52) U.S. Cl.
CPC ................ *C04B 16/00* (2013.01); *C04B 7/02* (2013.01); *C04B 7/323* (2013.01);
(Continued)

(58) Field of Classification Search
CPC ........... C04B 16/00; C04B 7/02; C04B 7/323; C04B 40/0039; C04B 2103/0001;
(Continued)

(56) References Cited

U.S. PATENT DOCUMENTS

2002/0047058 A1* 4/2002 Verhoff .................... A61K 9/14 241/26

FOREIGN PATENT DOCUMENTS

CN 108658539 A * 10/2018 ............. C04B 28/04
WO WO-2023272905 A1 * 1/2023 ......... C04B 40/0039

OTHER PUBLICATIONS

CN10865839A translation (Year: 2018).*
(Continued)

*Primary Examiner* — Pamela H Weiss
(74) *Attorney, Agent, or Firm* — CBM PATENT CONSULTING, LLC

(57) ABSTRACT

A color-adjustable repairing agent and a preparation method therefor, and concrete containing the repairing agent are disclosed in the present invention; the repairing agent is a mixture of microbial powder, dopamine and a calcium source immobilized by cement; and according to total mass of the mixture, a mass percentage of the microbial powder is 44%-54%, a mass percentage of the dopamine is 1%-5%, and a mass percentage of the calcium source is 44%-54%; according to the present invention, dopamine is mixed into a microbial self-repairing agent, a cement-immobilized microbial self-repairing agent is used for preparing repairing agent particles, a crack area of microbial self-repairing concrete is repaired, and repairing performance of the concrete and a color of a repairing product of the crack area are tested.

9 Claims, 4 Drawing Sheets

(51) Int. Cl.
*C04B 7/32* (2006.01)
*C04B 40/00* (2006.01)
*C04B 103/00* (2006.01)
*C04B 111/72* (2006.01)

(52) U.S. Cl.
CPC .. *C04B 40/0039* (2013.01); *C04B 2103/0001* (2013.01); *C04B 2111/72* (2013.01)

(58) Field of Classification Search
CPC . C04B 2111/72; C04B 20/1077; C04B 28/04; C04B 40/0042; C04B 24/121; C04B 22/16; Y02W 30/91
See application file for complete search history.

(56) References Cited

OTHER PUBLICATIONS

Bio-inspired functionalization of very fine aggregates for better performance of cementitious materials by Yi Fang, Jialai Wang, Xin Qian liang Wang Guangping Lin Zhongqi Liu Construction and Building Materials 241 (2020) 118104 (Year: 2020).*

* cited by examiner

COLOR-ADJUSTABLE REPAIRING AGENT AND PREPARATION METHOD THEREFOR, AND CONCRETE CONTAINING REPAIRING AGENT

TECHNICAL FIELD

The present invention belongs to a cement-based material and a preparation method, and particularly relates to a repairing agent for a crack area of microbial self-repairing concrete and a preparation method therefor, and microbial self-repairing concrete using the repairing agent.

BACKGROUND ART

Self-repairing concrete is such concrete material that features self-repairing and regeneration of material damage, and restores or even improves the performance of material through a method of composite of repairing adhesive and concrete material. Self-repairing concrete can solve the intractable problems of untimely repair and construction difficulties in traditional passive repair methods, and has great potential for timely repair of major civil infrastructure as well as mitigating impacts of typhoons and earthquakes, so the self-repairing concrete is extremely important for ensuring the safety and durability of buildings.

As a type of self-repairing concrete, microbial self-repairing concrete repairs cracks produced during the use of concrete based on the microbial-induced calcium carbonate precipitation technology by filling the cracks with microbial-induced mineralized deposited calcium carbonate. Compared with the self-repairing methods based on chemical or physical principles, the microbial self-repairing process is more green and gentle. Under the guidance of green development nowadays, the microbial-induced calcium carbonate precipitation technology has been widely noticed and applied in many projects.

However, this technology still has many problems be solved urgently in the field of concrete self-repairing, such as color adjustment of microbial mineralized products. Microbial-induced mineralized deposited calcium carbonate is presented as white, which is not coordinated with the color of a concrete matrix, so there is a color difference of a repaired surface of the concrete, which has an impact on the integrity of the appearance of the concrete. Current studies on microbial self-repairing concrete have focused on improving the repair performance, but little research has been reported on adjustment the color of mineralized products.

SUMMARY

An objective of the present invention is to provide a repairing agent which can adjust a color of a microbial mineralized product and reduce a color difference between a repairing product and a concrete matrix. A second objective of the present invention is to provide a preparation method for the above repairing agent. A third objective of the present invention is to provide microbial self-repairing concrete containing the above repairing agent.

According to the technical solution, the present invention provides a color-adjustable repairing agent, being a mixture of cement-immobilized microbial powder, dopamine and a calcium source. According to total mass of the mixture, a mass percentage of the microbial powder is 44%-54%, a mass percentage of the dopamine is 1%-5%, and a mass percentage of the calcium source is 44%-54%.

In the solution, mixture powder of dopamine, microbial powder and a calcium source immobilized by cement is used to obtain the color-adjustable repairing agent. The microbial powder is selected from *bacillus mucilaginosus, bacillus alkalophilus*, and the like, and the microbial powder is purchased from China Center of Industrial Culture Collection, can produce spores, can induce generation of a mineralized product, is harmless to human bodies and has desirable ecological property. The calcium source includes one or more types of solid powder of calcium formate and calcium phosphate, and the calcium source is selected to provide calcium ions required by a microbial mineralization reaction and has less influence on performance of a concrete matrix. The cement includes sulphoaluminate cement or portland cement, and the cement is selected to serve as a shell part of repairing agent particles and prevent the microbial self-repairing agent from being activated in advance which causes activity of a repairing process to decrease.

A process of microbial powder induced mineralization is as follows: when concrete cracks, outside air and water enter a crack area, spores are activated to generate ammonia gas and carbon dioxide in the concrete through metabolism, a system is alkaline with hydrolysis of the ammonia gas and the carbon dioxide, and the calcium source releases free $Ca^{2+}$ to be mineralized under an alkaline condition and to form calcium carbonate, such that the crack area is repaired.

Moreover, the added dopamine may further react with the mineralized product, with a main reaction process as follows:

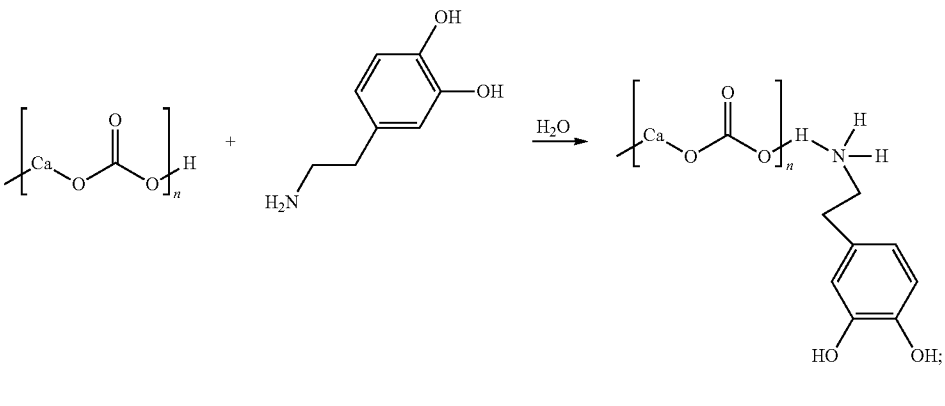

;

-continued

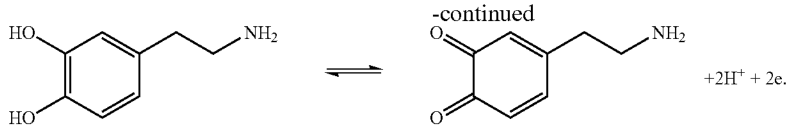

Firstly, —$NH_2$ in the dopamine is connected to the calcium carbonate by means of reaction, to generate an organic-inorganic composite structure with a —N . . . H—O— hydrogen bond structure, and then hydroxyl in a dopamine structure is oxidized in air to form quinone, to generate a black polymer, such that a color of an organic-inorganic composite product is adjusted.

The present invention further protects a preparation method for the color-adjustable repairing agent. The preparation method includes the following steps:

(1) mixing microbial powder, dopamine and a calcium source, and performing uniform stirring to obtain mixed powder for later use;

(2) taking a proper amount of an adhesive substance, spraying distilled water on a surface of the adhesive substance, and pouring the adhesive substance into a sugarcoating machine; and spraying the mixed powder prepared in the step (1) and water mist into the sugarcoating machine in batches for powder-coating granulation, and sieving particles after granulation; and (3) pouring the sieved particles into the sugarcoating machine again, spraying cement powder and water mist into the sugarcoating machine in batches for powder-coating granulation, and performing sieving to obtain repairing agent particles after granulation.

Further, in the step (1), a mass ratio of the microbial powder to the dopamine to the calcium source is 10-45:10-45:1.

Further, in the step (2), the adhesive substance is sucrose particles. The adhesive substance is particles having adhesiveness, capable of adhering to powder as an inner core, and harmless to bacteria.

Further, in the step (2), a particle size after sieving is 1.75 mm-2.36 mm; and in the step (3), a particle size after sieving is 3.5 mm-4.0 mm. A reason for controlling the particle size is that the repairing agent particles are added into a concrete member to replace part of the aggregate, in the case that the particle size is too large, mechanical properties of the concrete member will be reduced, and in the case the particle size is too small, the content of the self-repairing agent is low, causing a repair effect to be reduced.

Further, after the step (3), the preparation method further includes curing the repairing agent particles. A curing process includes: making the repairing agent particles stand for 45 h-50 h in a ventilation environment with a constant temperature of 20° C.-30° C., and spraying water mist on a surface of the repairing agent every 6 h-8 h, to keep the surface wet. A purpose of curing is to improve hardness of a cement housing and reduce a phenomenon that the repairing agent particles crack in advance during a concrete mixing process.

The present invention also provides concrete. Components of the concrete include the color-adjustable repairing agent, the repairing agent is added instead of the fine aggregate, and the mixing amount of the repairing agent is 0.5%-4%. A formula of the concrete is as follows: raw materials in the concrete include P·O42.5 ordinary portland cement, basalt stone, river sand and the repairing agent particles. A proportion of the concrete is calculated according to performance requirements in an actual project. According to the preparation method, a preparation principle is to make cement powder adhere to the surface of the repairing agent for immobilization protection on the repairing agent, so as to prevent microorganism from being activated in advance which causes activity of a repairing process to decrease. Moreover, the cement housing has compatibility with the concrete matrix, such that an influence on the performance of the concrete member is small.

Beneficial effects: compared with the prior art, the present invention has the following obvious advantages: (1) a color of a microbial mineralized product is regulated and controlled through a method of combining organic matters with inorganic matters, a color difference between the mineralized product and a concrete matrix is reduced, and an appearance attractive requirement of a surface of the self-repairing concrete is satisfied. (2) The organic-inorganic composite structure generated by reaction of dopamine and microbial mineralized products has certain adhesiveness, and is beneficial to filling and repairing of the mineralized products in a crack area of the concrete. (3) The mineralizing microorganism can produce spores, is suitable for the field of engineering materials, is harmless to human body and has a desirable ecological property.

DETAILED DESCRIPTION OF THE EMBODIMENTS

The technical solution of the present invention will be further elaborated hereafter in conjunction with accompanying drawings and the examples.

Example 1

(1) *Bacillus mucilaginosus* powder, calcium formate, dopamine were mixed in a mass ratio of 30:30:1 to prepare mixed powder, sucrose was taken as a core, sucrose particles were spread, water mist was sprayed on surfaces of the particles, the particles were poured into a sugarcoating machine, the mixed powder and water mist were sprayed into the sugarcoating machine in batches for powder-coating granulation, and repairing agent particles were sieved to obtain particles with a particle size of 1.75 mm-2.36 mm after granulation.

(2) The particles were coated with sulphoaluminate cement by using the sugarcoating machine again, sieved particles were poured into the sugarcoating machine again, sulphoaluminate cement and water mist were sprayed into the sugarcoating machine in batches for powder-coating granulation, and repairing agent particles were sieved to obtain particles with a particle size of 3.5 mm-4.0 mm, that is, the repairing agent, after granulation.

(3) The repairing agent particles were placed in a ventilation environment with a constant temperature of 20° C. for curing for 48 h, and water mist was sprayed on a surface of a carrier every 6 h to keep the surface of the carrier moist.

(4) 1037 g/L of P·O42.5 ordinary portland cement, 47 g/L of the repairing agent and 546 g/L of water were weighed, a pure slurry sample was mixed, the pure slurry sample was cured for 3 d under standard conditions, and a crack was made on the sample.

Figure 1:
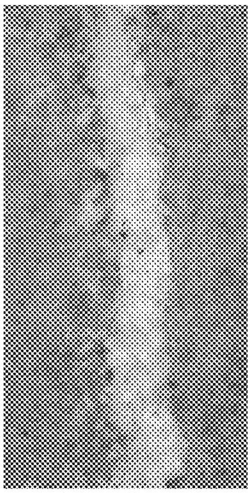
FIG. 1 is a schematic diagram of a crack repairing site of a sample with repairing agent particles containing dopamine according to Example 1.
Figure 2:
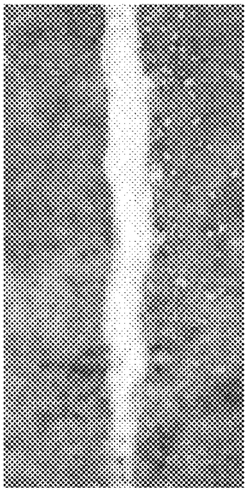
FIG. 2 is a schematic diagram of a crack repairing site of a sample with repairing agent particles containing no dopamine according to Example 1.

(5) The cracked pure slurry sample was cured in water at 20° C. for 7 d, a crack area (as shown in FIG. 1) was observed with a stereo microscope, the crack was filled with a microbial mineralized product, and it can be seen that mixing of dopamine has little effect on a crack surface repairing effect. Compared with a crack repairing area of the sample without dopamine (as shown in FIG. 2), a repairing product of the sample with dopamine in the crack area had an off-white color, and a color difference between the repairing product and the concrete matrix decreased, such that mixing of dopamine can adjust the color of the repairing product.

Figure 8:
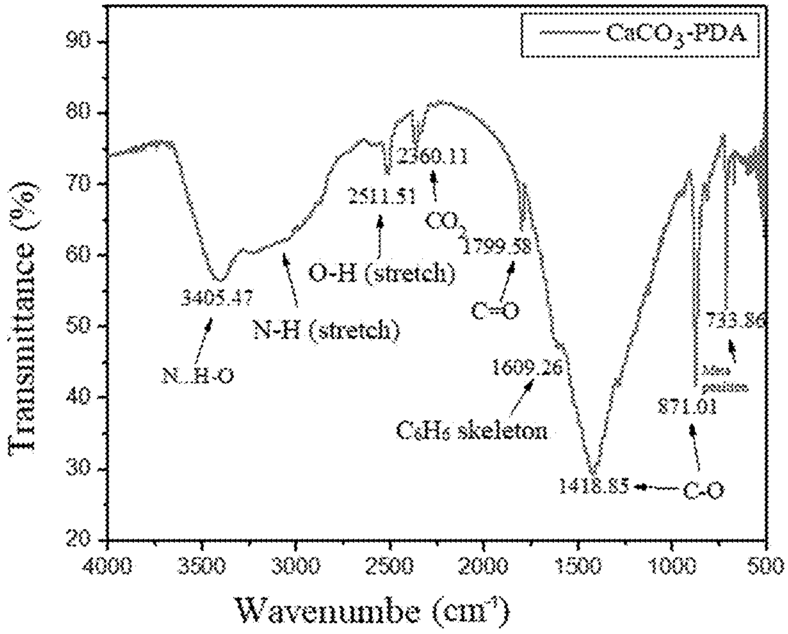
FIG. 8 is an infrared analysis spectrum of a mineralized product in Example 1.

The repairing product obtained after color adjustment was extracted, dried, ground, and detected by using a Fourier transform infrared absorption spectrometer, and feasibility of color adjustment on the mineralized product by dopamine was analyzed. An infrared spectrum of the obtained mineralized product is shown in FIG. 8. There is an N . . . H—O hydrogen bond oscillation peak at a wavenumber of 3405.47 $cm^{-1}$, indicating that dopamine and calcium carbonate are connected by a hydrogen bond, to form an organic-inorganic composite structure.

Example 2

(1) *Bacillus alkalophilus* powder, calcium chloride, dopamine were mixed in a mass ratio of 10:10:1 to prepare mixed powder, sucrose was taken as a core, sucrose particles were spread, water mist was sprayed on surfaces of the particles, the particles were poured into a sugarcoating machine, the mixed powder and water mist were sprayed into the sugarcoating machine in batches for powder-coating granulation, and repairing agent particles were sieved to obtain particles with a particle size of 1.75 mm-2.36 mm after granulation.

(2) The particles were coated with portland cement by using the sugarcoating machine again, sieved particles were poured into the sugarcoating machine again, portland cement and water mist were sprayed into the sugarcoating machine in batches for powder-coating granulation, and repairing agent particles were sieved to obtain particles with a particle size of 3.5 mm-4.0 mm, that is, the repairing agent, after granulation.

(3) The repairing agent particles were placed in a ventilation environment with a constant temperature of 30° C. for curing for 50 h, and water mist was sprayed on a surface of a carrier every 8 h to keep the surface of the carrier moist.

(4) 347 g/L of P·O42.5 ordinary portland cement, 40 g/L of the repairing agent, 746 g/L of river sand, 1187 g/L of basalt stone, and 170 g/L of water were weighed, a concrete sample was mixed, the concrete sample was cured for 3 d under standard conditions, and a crack was made on the sample.

Figure 3:
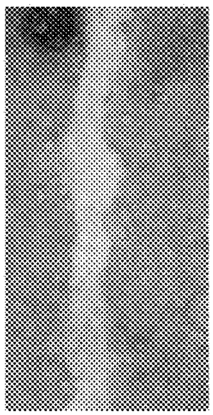
FIG. 3 is a schematic diagram of a crack repairing site of a sample with repairing agent particles containing dopamine according to Example 2.

(5) The cracked pure slurry sample was cured in water at 20° C. for 7 d, a repairing situation was observed with a stereo microscope, and a crack repairing area was shown in FIG. 3.

Example 3

(1) *Bacillus mucilaginosus* powder, calcium phosphate, dopamine were mixed in a mass ratio of 45:45:1 to prepare mixed powder, sucrose was taken as a core, sucrose particles were spread, water mist was sprayed on surfaces of the particles, the particles were poured into a sugarcoating machine, the mixed powder and water mist were sprayed into the sugarcoating machine in batches for powder-coating granulation, and repairing agent particles were sieved to obtain particles with a particle size of 1.75 mm-2.36 mm after granulation.

(2) The particles were coated with sulphoaluminate cement by using the sugarcoating machine again, sieved particles were poured into the sugarcoating machine again, sulphoaluminate cement and water mist were sprayed into the sugarcoating machine in batches for powder-coating granulation, and repairing agent particles were sieved to obtain particles with a particle size of 3.5 mm-4.0 mm, that is, the repairing agent, after granulation.

(3) The repairing agent particles were placed in a ventilation environment with a constant temperature of 25° C. for curing for 45 h, and water mist was sprayed on a surface of a carrier every 7 h to keep the surface of the carrier moist.

(4) 347 g/L of P·O42.5 ordinary portland cement, 23 g/L of the repairing agent, 764 g/L of river sand, 1187 g/L of basalt stone, and 170 g/L of water were weighed, a concrete sample was mixed, the concrete sample was cured for 3 d under standard conditions, and a crack was made on the sample.

Figure 4:
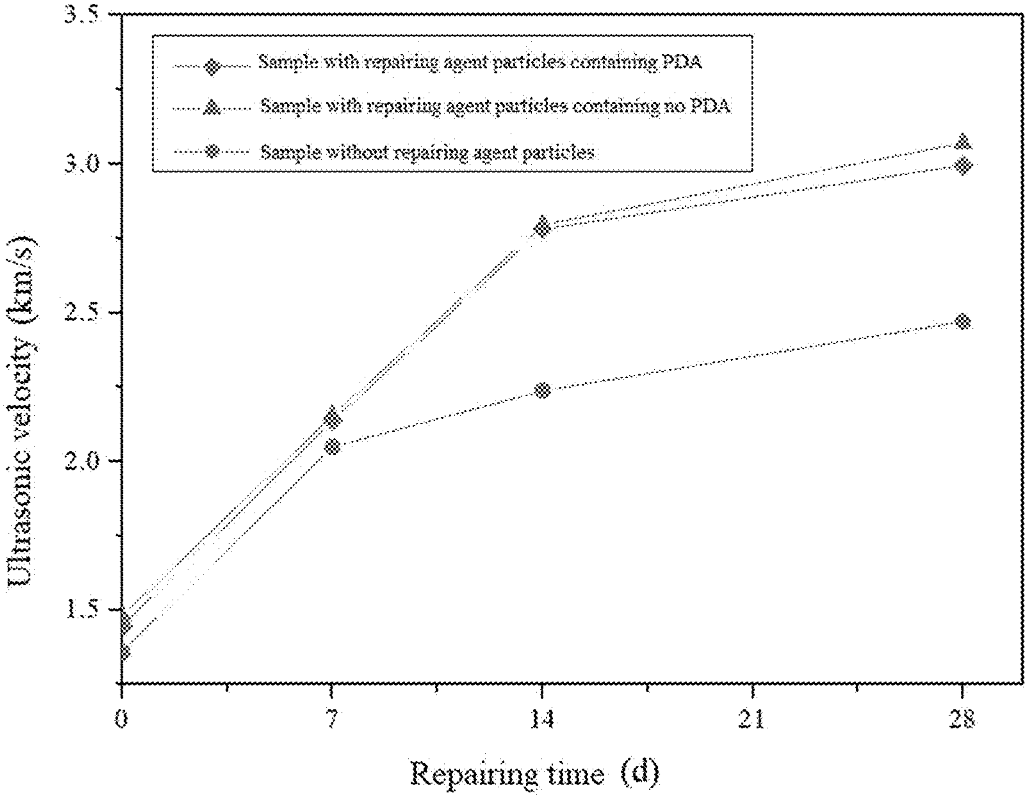
FIG. 4 shows a variation of an ultrasonic velocity of a concrete sample with a repairing time in Example 3.
Figure 5:
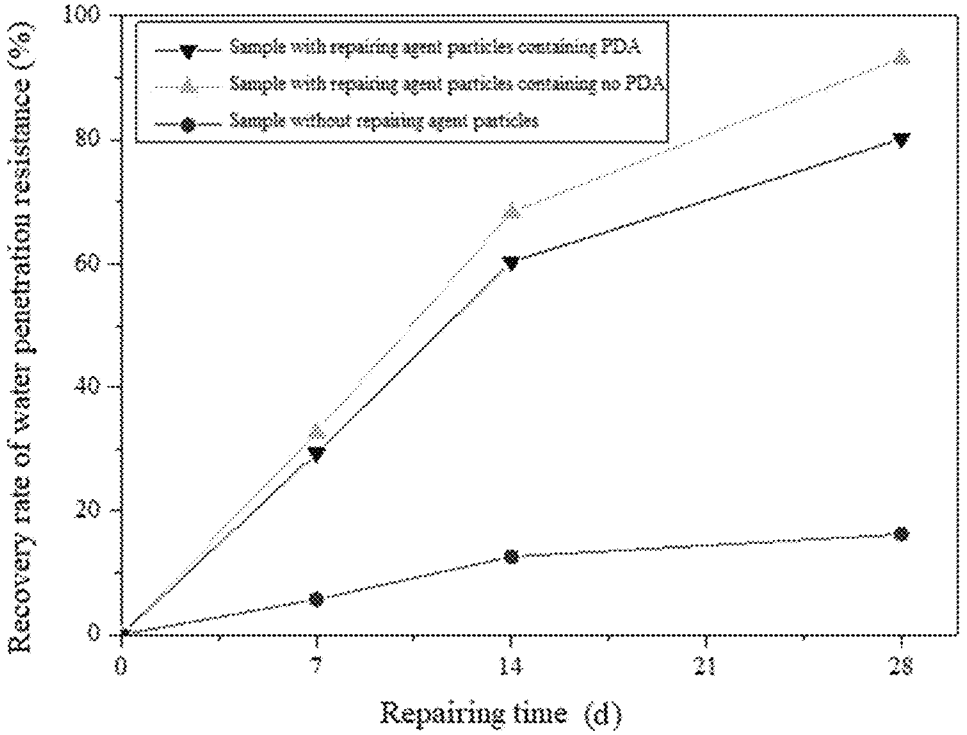
FIG. 5 shows a variation of a recovery rate of water penetration resistance of a concrete sample with a repairing time in Example 3.

(5) The cracked pure slurry sample was cured in water at 20° C., when a curing time was 7d, 14d and 28d, a bonding situation of a repairing product in the concrete crack was analyzed by ultrasonic velocity detection, and as shown in FIG. 4, the bonding situation was compared with that of a sample with repairing agent particles containing dopamine and that of a sample without repairing agent particles for analysis. An ultrasonic velocity of the concrete sample with dopamine was similar to that of the concrete sample without dopamine, indicating that the mixing of dopamine has little effect on bonding of a repairing product in a concrete crack. A filling situation of the repairing product in the concrete crack was analyzed by means of detection of a recovery rate of water penetration resistance, and as shown in FIG. 5, the filling situation was compared with that of the sample with repairing agent particles containing dopamine and that of the sample without repairing agent particles for analysis. The recovery rate of water penetration resistance of the concrete sample with dopamine was slightly lower than that of the sample without dopamine, and much higher than that of the sample without repairing agent particles, indicating that mixing of dopamine has little effect on filling of a repairing product in a concrete crack.

Example 4

In order to verify reaction of dopamine with a microbial mineralized product, the following experiment is performed:

(1) Water was added to dissolve and mix bacterial liquid, a calcium source and dopamine powder, and reaction liquid was prepared.

(2) The liquid was placed in a light-proof environment at a normal temperature for standing reaction for 7 d, and suspension containing the mineralized product was obtained after the mineralization reaction is finished.

(3) The suspension was filtered, and a precipitate was washed with deionized water and absolute ethyl alcohol.

(4) The precipitate was dried to obtain synthetic product powder.

Figure 6:
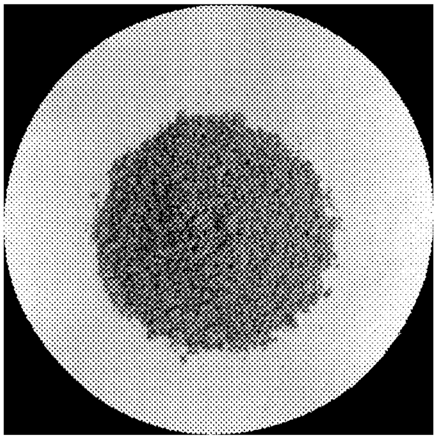
FIG. 6 shows synthetic product powder mixed with dopamine in Example 4.
Figure 7:
FIG. 7 shows synthetic product powder without dopamine in Example 4.

(5) The synthetic product powder (as shown in FIG. 5) with dopamine (PDA) was compared with synthetic product powder (as shown in FIG. 6) without dopamine for analysis, the synthetic product containing dopamine appeared brown-gray, and the synthetic product without dopamine appeared white. Gray values of the synthetic products were detected by ImageJ software (a gray value of black is 0, and a gray value of white is 255). The gray values of the two synthetic products were 110.136 and 177.489 respectively. Dopamine can reduce the gray value of the synthetic product and make the product darker.

What is claimed is:

1. A preparation method for a color-adjustable repairing agent, comprising the following steps:

(1) mixing microbial powder, dopamine and a calcium source, and performing uniform stirring to obtain mixed powder for later use;

(2) taking an effective amount of an adhesive substance, spraying distilled water on a surface of the adhesive substance, and pouring the adhesive substance into a sugarcoating machine; and spraying the mixed powder prepared in the step (1) and water mist into the sugarcoating machine in batches for powder-coating granulation, and sieving particles after granulation; and (3) pouring the sieved particles into the sugarcoating machine again, spraying cement powder and water mist into the sugarcoating machine in batches for powder-coating granulation, and performing sieving to obtain repairing agent particles after granulation.

2. The preparation method for the color-adjustable repairing agent according to claim 1, wherein in the step (1), a mass ratio of the microbial powder to the dopamine to the calcium source is 10-45:10-45:1.

3. The preparation method for the color-adjustable repairing agent according to claim 1, wherein in the step (2), the adhesive substance is sucrose particles.

4. The preparation method for the color-adjustable repairing agent according to claim 1, wherein in the step (2), a particle size after sieving is 1.75 mm-2.36 mm; and in the step (3), a particle size after sieving is 3.5 mm-4.0 mm.

5. The preparation method for the color-adjustable repairing agent according to claim 1, wherein after the step (3), the preparation method further comprises curing the repairing agent particles, wherein a curing process comprises: making the repairing agent particles stand for 45 h-50 h in a ventilation environment with a constant temperature of 20° C.-30° C., and spraying water mist on a surface of the repairing agent every 6 h-8 h, to keep the surface wet.

6. The preparation method for the color-adjustable repairing agent according to claim 1, wherein the color-adjustable repairing agent comprises 44%-54% of the microbial powder, 1%-5%, of the dopamine and 44%-54% of the calcium source by weight.

7. The preparation method for the color-adjustable repairing agent according to claim 1, wherein the cement powder comprises sulphoaluminate cement or portland cement.

8. The preparation method for the color-adjustable repairing agent according to claim 6, wherein the microbial powder is *Bacillus mucilaginosus* or *Bacillus alkalophilus*.

9. The preparation method for the color-adjustable repairing agent according to claim 6, wherein the calcium source comprises one or more types of solid powder of calcium formate, calcium chloride and calcium phosphate.

* * * * *